C. T. MYERS.
FENDER.
APPLICATION FILED DEC. 7, 1917.
1,372,081.
Patented Mar. 22, 1921.
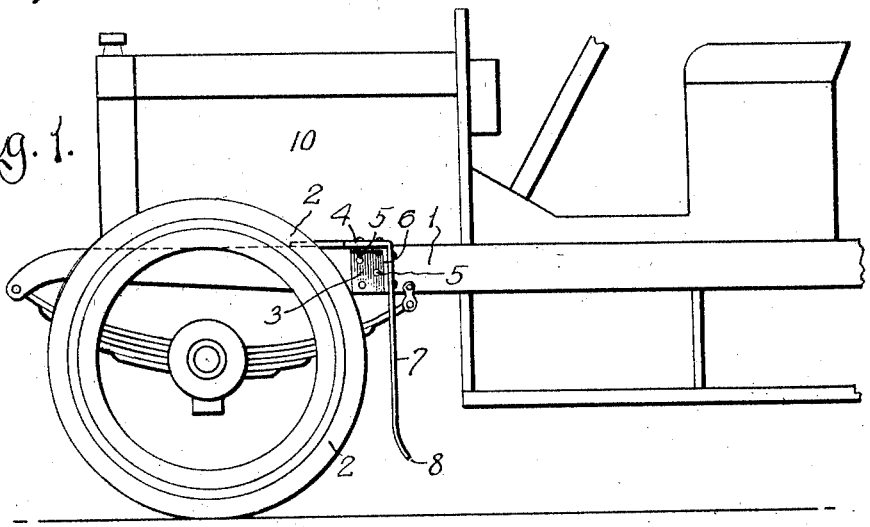
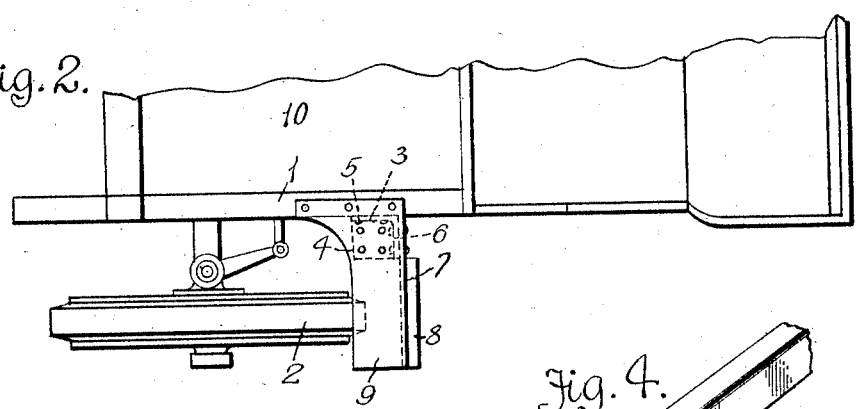
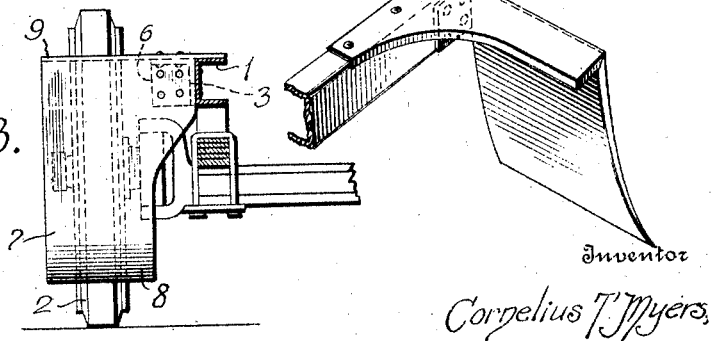
Inventor
Cornelius T. Myers,
Witness
Chas. W. Stauffiger
Chas. Balz.
By
Attorneys

UNITED STATES PATENT OFFICE.

CORNELIUS T. MYERS, OF DETROIT, MICHIGAN.

FENDER.

1,372,081.  Specification of Letters Patent.  Patented Mar. 22, 1921.

Application filed December 7, 1917. Serial No. 205,928.

*To all whom it may concern:*

Be it known that I, CORNELIUS T. MYERS, a citizen of the United States of America, residing at Detroit, in the county of Wayne and State of Michigan, have invented certain new and useful Improvements in Fenders, of which the following is a specification, reference being had therein to the accompanying drawings.

This invention relates to mud guards, and has special reference to guards that may be advantageously used at the front or steering wheels of a truck or other motor driven vehicle.

The primary object of my invention is to provide simple, strong and inexpensive guards that may be easily and quickly installed at the side frames of a vehicle to prevent mud and other matter from being thrown upwardly from the wheels onto the running gear or body of the vehicle. The guard is also designed not to extend fully over the wheel and thus does not interfere with easy access being had to the engine or the vehicle in proximity to the front or steering wheels.

Another object is to provide guards that will allow a driver to observe the front wheels, and also form a shelf for tools when a driver or other person has to make adjustments to the engine or adjacent parts.

A further object of my invention is to provide a light sheet metal mud guard that may be located adjacent a wheel, without interfering with the movements thereof, and which will resist road vibrations.

The mud guard will be hereinafter specifically described and then claimed, and reference will now be had to the drawing, wherein—

Figure 1 is a side elevation of the mud guard as applied to a portion of a truck;

Fig. 2 is a plan of the same;

Fig. 3 is a rear elevation of the mud guard, and

Fig. 4 is a modified construction.

As showing an installation of the mud guard there is a main vehicle frame 1 and connected to the outer side of said frame, in proximity to a front or steering wheel 2 of the vehicle is an outwardly extending bracket, comprising an angle or corner iron 3 having a lateral flange 4 that stiffens and adds rigidity to the outwardly extending vertical portion 6 of the angle iron, and with said angle iron riveted or otherwise connected to the frame, as at 5, the outer portion of said iron is maintained at any desired angle to the side of the frame.

Riveted or otherwise connected to the vertical portion 6 of the angle iron 3, is a depending guard or shield member 7 having the greater part thereof in a substantially vertical plane and the lower end thereof bent or turned rearwardly, as at 8. This shield or member 7 presents a wall in rear of the wheel 2 against which mud and other matter will be thrown from the wheel.

The shield or member has a longitudinal flange 9 extending over a portion of the wheel 2 and on to the flange 4 and the frame 1, said flanges 9 being riveted or otherwise connected to the frame 1 and to the flange 4. The vertical portion of the shield or member is riveted or otherwise connected to the flange 6 of the angle iron. This provides an extremely rigid construction and the flange 9 can withstand considerable weight. By reference to Fig. 2 it will be noted the edge of the flange 9 is curved just enough to provide clearance for the steering of the wheel, so that it serves as a stop for such mud as may be discharged from the wheel no matter how the wheel is turned for steering.

With the mud guard solely supported from the frame 1 without extending over or above the extreme top of the wheel 2, easy access can be had to the engine or motor hood 10 of the vehicle, and this is particularly advantageous in connection with motor trucks, where the front or steering wheels are generally large and together with the fenders provide a barrier that prohibits a chauffeur or truck operator from easily reaching the engine hood to open it, or for making adjustments of parts under the hood.

The mud guard may be made of light sheet metal, preferably of one piece with an integral bracket, as shown in Fig. 4, and while this illustrates another embodiment of my invention, it is to be understood that the structural elements are susceptible to such changes as fall within the scope of the appended claims.

What I claim is:—

1. A vehicle wheel mud guard comprising an approximately horizontal portion having an inner end adapted to be connected to a vehicle frame and having an edge shaped to follow the arc of the wheel when the wheel is turned to steer the vehicle, said horizontal portion located approximately at the level of the vehicle frame and its rear edge provided with an integral depending portion directly in the rear of the wheel.

2. The combination with a vehicle frame, of a wheel mud-guard comprising a one-piece rigid sheet formed to provide approximately horizontal and vertical portions, and a bracket near the juncture of said portions connecting said guard to said frame to maintain said guard in proximity to the wheel.

3. In combination in a vehicle, a main horizontal frame, a steering wheel, a mudguard comprising a substantially horizontal plate laterally extending from the main frame, a plate portion rigidly secured to the horizontal plate near the outer end thereof and extending substantially vertical below said horizontal plate, means to secure said plate rigidly to the vehicle frame.

4. In combination in a vehicle with a substantially horizontal main frame member, a steering wheel yieldingly supported with respect thereto, a mudguard comprising a substantially horizontal flat plate located at the rear of the wheel, and having its forward edge extending in advance of the vertical projection of the extreme rear periphery of the wheel in normal and inwardly deflected positions of the steering wheel, a substantially vertical plate rigidly secured near the outer end of the horizontal member and means for rigidly supporting said horizontal and vertical plates with respect to the vehicle frame.

5. A mudguard for a vehicle, comprising a substantially horizontal plate, a plate member extending substantially vertical below said horizontal plate and rigidly secured thereto near its outer end, means to secure both of said plates in rigid relation to the main frame member of a vehicle.

6. A mudguard for the steering wheel of a vehicle comprising a substantially horizontal plate having its forward edge in advance of the vertical projection from the extreme rear point in the periphery of the steering wheel and above the level of the middle of said wheel, a downwardly extending plate rigidly secured to a portion of the horizontal plate and means to hold both of said plates in rigid relation with the main frame member of the vehicle.

In testimony whereof I affix my signature in the presence of two witnesses.

CORNELIUS T. MYERS.

Witnesses:
A. EUGENE PATTISON,
JOHN J. FLYNN.